United States Patent Office 2,970,142
Patented Jan. 31, 1961

2,970,142

PROCESS FOR PREPARING DRYING OILS FROM SUCROSE AND RAFFINOSE

Henry B. Hass, Summit, N.J., assignor to Sugar Research Foundation, Inc., New York, N.Y., a corporation of New York No Drawing. Filed Sept. 28, 1956, Ser. No. 612,874

9 Claims. (Cl. 260—234)

This invention relates to improved synthetic drying oils produced from sucrose or raffinose and to a process for producing them. More particularly, the present invention relates to a process for producing drying oils which are esters of sucrose or raffinose and a drying oil acid, and which contains at least four of such acid groups for each molecule of sucrose or raffinose, and to the resulting drying oils produced thereby.

It is an object of the present invention to provide a process for producing superior synthetic drying oils from sucrose or raffinose and which may be employed in producing paints, varnishes and other finishes.

It is a further object of the present invention to provide drying oils which dry rapidly to a hard, non-tacky, non-frosting finish and which are free from an undesirable dark colored appearance. Other objects will be apparent to those skilled in the art from reading this specification.

There is disclosed in U.S. Patent No. 2,077,371 of A. E. Rheineck et al. a process for producing drying oils by reacting a polyhydroxy compound and a drying oil acid chloride. While the resulting esters possess certain advantages over the naturally-occuring glyceridic drying oils, they are dark in color; so dark that they impart an unsightly color to paints and finishes containing them. In spite of the fact that this patent issued nearly twenty years ago, drying oils produced in accordance with the process of the patent have not achieved any substantial commercial application.

In accordance with the present invention it is possible to produce drying oils from sucrose or raffinose which dry rapidly to a hard, non-frosty finish and which are pale or light in color or substantially colorless and may be employed in compounding light-colored paints and finishes without imparting a dark unsightly coloration.

The improved drying oils of the present invention are produced by reacting sucrose or raffinose with a lower alkanol ester of a drying oil acid. The reaction is desirably, but not necessarily, conducted in an aromatic, aliphatic, alicyclic or heterocyclic solvent having an amide group or constituent or a solvent which is a heterocyclic or aliphatic tertiary amine, or a dialkylsulfoxide, although in many cases the use of a solvent may be dispensed with. The reaction mixture shall contain an alkaline catalyst. Preferably, substantially anhydrous conditions are employed as even small amounts of moisture may retard the rate of reaction. The reaction is produced by heating the reaction mixture at a temperature of from about 20° C. up to about 120° C. The optimum temperature range is from about 80° to 110° C. At the lower temperatures the reaction products are less colored. The reaction time required is usually between about two hours to twenty-four hours, depending somewhat upon the temperature of the reaction mixture and the alkalinity of the catalyst, although two to nine hours is generally preferred.

The lower alkanol esters of the drying oil acids are desirably of a lower monohydric volatile alcohol containing not more than three carbon atoms, such as methanol and ethanol.

The esters of a volatile monohydric alcohol and the drying oil fatty acids are obtained from the naturally-occurring glyceridic drying oils in accordance with known procedures.

The drying oil fatty acids which form the lower alkanol esters employed as a starting material in the process may be any of the polyunsaturated fatty acids produced by the hydrolysis of a drying oil. Such fatty acids are characterized by having two or more double bonds, which may or may not be conjugated. The polyunsaturated fatty acids are desirably conjugated and desirably contain at least 16 carbon atoms each. The drying oil fatty acids which may be employed are those derived from the hydrolysis of the glyceridic drying oils or reacting the glyceridic drying oils with a volatile lower alkanol. Among the drying oils which may be employed for this purpose are: linseed, China-wood, Perilla, tung, sunflower and soya-bean oils and rosin.

The volatile alcohol is preferably stripped from the reaction mixture by distillation, desirably under reduced pressure, as it is liberated during the formation of the sucrose or raffinose ester. This permits a more rapid reaction and provides higher yields of the sucrose or raffinose esters, and accomplishes a separation of the volatile alcohol from the reaction solvent and the reaction products.

As an alternative to vacuum distillation, the volatile alcohol may be removed from the reaction mixture by heating the mixture at substantially atmospheric pressure to a temperature of about the boiling point of the alcohol and sweeping the system with an inert gas, such as nitrogen, which will not react with the reactants or the reaction products to any substantial degree.

As one preferred means of aiding vacuum distillation in driving off the volatile alcohol liberated during the process, one may employ a turbulent film evaporator, such as the "Turba-film" evaporator or other apparatus having a large heated surface area.

Among the suitable solvents which may be employed for the process of the invention are such tertiary amines as: trimethylamine, triethylamine, N-methylmorpholine, pyridine, quinoline, pyrazine, methylpyrazine, N,N-dimethylpiperazine, etc., such amides as: formamide, N,N-dimethylformamide, 2-pyrrolidone, N-methyl-2-pyrrolidone, etc. Dimethyl sulfoxide is an excellent solvent. Other solvents may be suitably employed. The solvent material employed may contain other additional polar groups in the molecule although such groups preferably exclude mercapto, hydroxyl, ester, primary and secondary amino groups. Desirably the amine or amide shall have not more than 6 carbon atoms for each nitrogen atom present in the molecule and the total number of carbon atoms shall not exceed 12. The preferred solvents employed to date are N,N-dimethylformamide and dimethylsulfoxide. It is preferred to employ a solvent which is less volatile than the volatile alkanol which forms the alkanol ester of the drying oil fatty acid.

Among the alkaline catalysts which may be employed are several types of metals, hydroxides, inorganic salts and organic compounds, including alkali-metal hydroxides, such as potassium, sodium and lithium hydroxides, salts of an alkali-metal and a weak acid, such as sodium carbonate, potassium carbonate, etc.; or such alkaline salts as trisodium phosphate; or alkali-metal alcoholates, such as sodium methoxide, potassium ethoxide, sodium ethoxide; or organic bases, such as the quaternary ammonium bases, including the mixed alkyl-dimethyl-benzyl ammonium hydroxides, the alkyl-trimethyl ammonium hydroxides and tetra-alkyl quaternary ammonium hydroxides, such as tetramethylammonium hydroxide, cetyldimethylbenzyl-ammonium hydroxide, etc.; or the alkali metal sucrates or raffinates, such as sodium sucrate, sodium, raffinate, etc. Additionally, metals, such as tin and zinc, may be employed. Alkaline salts and alkali metal carbonates, and particularly potassium carbonate, are the preferred catalysts.

Generally speaking, the alkaline catalysts which are satisfactory are those which are soluble in the solvents employed and which, when added in a 1% w./v. concentration in a 0.5% w./v. phenolphthalein solution in a solvent containing equal parts by volume of oiled N,N-dimethylformamide and carbon dioxide-free water, gives the characteristic alkaline phenolphthalein magenta color. The phenolphthalein solution is prepared by first boiling the N,N-dimethylformamide for 15 minutes to remove volatile amines. One gram of phenolphthalein is dissolved in 100 ml. of the boiled N,N-dimethylformamide and 100 ml. of carbon dioxide-free water is added. When 0.1 gram of the alkaline catalyst is added to 10 ml. of the resulting phenolphthalein indicator solution, it should give the well-known pinkish-purple or magenta color of alkaline phenolphthalein solutions.

It is contemplated that the ester of sucrose or raffinose and drying oil fatty acids shall contain at least four drying oil fatty acid groups or ester groups for each molecule of sucrose or raffinose. For this purpose it is desirable to employ at least about 6 or 8 or more moles of alkanol ester of the drying oil fatty acid for each molecule of sucrose or raffinose. Ratios in excess of about 16 moles of starting ester for each mole of sucrose or raffinose are not desirable since sucrose contains 8 and raffinose 11 esterifiable hydroxyl groups and excessive quantities of starting ester will not react with the sucrose or raffinose and must be recovered from the reaction mixture. It is contemplated that an ester of sucrose or raffinose containing less than 4 ester groups of a drying oil fatty acid may be employed as a starting material and additional ester groups introduced until at least 4, and preferably at least 5 or 6, are obtained. It is also contemplated that in addition to the at least 4 drying oil acid ester groups in the sucrose or raffinose molecule, other free hydroxyl groups in the saccharide may be esterified by other acyl groups, such as those of acetic, stearic, oleic acids, etc. However, for maximum drying properties it is desired that the saccharide contain as many drying oil fatty acid ester groups as possible, preferably with all free hydroxyl groups of the saccharide esterified with a drying oil fatty acid.

Based upon evidence available to date, it appears that the mechanism of the reaction which comprises the process of the present invention is based upon initial conversion of the succrose or raffinose to the sucrate or raffinate anions, respectively. This conversion can be accomplished in the reaction mixture by the alkaline catalyst. The alkaline catalyst appears to combine one of the hydroxyl hydrogen ions of the sucrose or raffinose with an alkaline anion to form the sucrate or raffinate anions, respectively. The sucrate or raffinate anion then appears to react with the ester of the fatty acid to form the sucrose or raffinose fatty acid esters of the invention and an alkoxyl anion. The alkoxyl anion then withdraws a hydrogen cation generating another sucrate or raffinate anion which continues the chain of reaction. Some of the supply of sucrate or raffinate anion is depleted during the process. Support for this suggested mechanism is found in the fact that the alkali-metal sucrates are satisfactory catalysts for the process.

As employed in this specification, the terms sucrate and raffinate refer to the anions formed upon replacing one of the hydrogen ions on one of the hydroxyl groups of sucrose or raffinose, respectively.

In order more clearly to disclose the nature of the present invention, specific examples illustrating the present invention will hereinafter be described. It should be understood, however, that this is done solely by way of example and is intended neither to delineate the scope of the invention nor limit the ambit of the appended claims. Parts are expressed in terms of parts by weight.

*Example I*

Employing only dry ingredients, 200 grams of sucrose were dissolved in one liter of dimethylformamide. Methyl linseedate (mono methyl ester of linseed oil fatty acids) (348 grams) and potassium carbonate (7.5 grams) were added to this solution. The mixture was heated under reflux for six hours at 90° C. and 100 mm. mercury pressure. After this six-hour period an additional 1050 grams of methyl linseedate and 7.5 grams of potassium carbonate were added. The mixture was heated for an additional 15 hours at 90° C. and 100 mm. mercury pressure. After the original six hours of refluxing plus three hours in the second period, 700 ml. of distillate were recovered. At this point, 500 ml. of dimethylformamide were added to the reaction mixture. At the completion of the reaction, the solution was cooled and filtered to remove potassium carbonate. The remainder of the dimethylformamide was removed by distillation. The final product (1393 grams) contained 70.9 percent of sucrose hexalinseedate, 23.1 percent of methyl linseedate and 6.0 percent of potassium linseedate.

*Example II*

Sucrose monolinseedate was prepared by mixing together and heating 112.5 grams of methyl linseedate, 387 grams of sucrose, and 7.5 grams of potassium carbonate in 1275 ml. of dry dimethylformamide. After heating for 12 hours at 90 to 95° C. and 100 mm. mercury pressure, analytical data indicated the absence of methyl linseedate; 3.5 percent of the original methyl linseedate was converted to potassium soap. The remainder of the methyl linseedate formed sugar esters in the weight ratio of 69 parts of sucrose monolinseedate to 31 parts of sucrose dilinseedate. The reaction mixture was vacuum distilled to remove about 90 percent of the dimethylformamide. To the resultant paste were added 600 ml. each of n-butanol and 5 percent aqueous sodium chloride solution. The mixture was heated with agitation until the paste dissolved completely in the two liquids. The butanol and water layers were separated hot and the butanol layer was washed once with an additional 500 ml. of hot 5 percent aqueous sodium chloride solution. The butanol solution was dried with anhydrous sodium sulfate, filtered and distilled to recover the sucrose esters free of solvent.

The sucrose linseedate obtained was reacted with methyl linseedate in the absence of solvent. The reaction mixture consisted of 50 grams of sucrose linseedate, 200 grams of methyl linseedate and 5 grams of potassium carbonate. The reaction mixture was heated for 9 hours at 120° C. and 2 mm. mercury pressure. The sucrose ester recovered corresponded to a tetralinseedate.

*Example III*

The procedure of Example II was repeated replacing the potassium carbonate with an equal amount of sodium methoxide. The sucrose linseedate recovered contained 6.3 linseedate groups per sucrose moiety.

*Example IV*

A solvent-free reaction mixture was prepared consisting of 50 grams of sucrose linseedate produced in Example II, 207.7 grams of methyl linseedate and 15 grams of lithium ricinoleate. After heating for 7 hours at 120° C. and 2 mm. mercury pressure, the product obtained corresponded to sucrose linseedate having 5.6 linseed oil fatty acid groups per molecule of sucrose.

*Example V*

The procedure of Example IV was repeated replacing the 15 grams of lithium ricinoleate with 5 grams of litharge as catalyst. The drying oil produced contained 5.2 linseed oil fatty acid groups per sucrose moiety.

Alkanol esters of other drying oil fatty acids may be employed in the foregoing examples, such as methyl or ethyl esters of the fatty acids of China-wood, Perilla, sunflower-seed, tung and oiticica oils.

Other alkaline catalysts may be employed in place of those employed in the examples described hereinabove. In particular, potassium methoxide, sodium ethoxide and other alkali-metal alcoholates may be satisfactorily employed, as well as alkali-metal sucrates, such as potassium sucrate and alkali-metal hydroxides such as sodium hydroxide and lithium hydroxide.

In place of the solvents employed in the above examples, other solvents may be employed. For example, excellent results have been obtained in employing N-methyl-2-pyrrolidone or 2-methylpyrazine. These solvents are particularly stable in the presence of highly basic catalysts. Other amines, such as trimethylamine, are satisfactory, although where the amine is low boiling, precautions must be taken to prevent loss of these materials when subjected to higher temperatures. The reaction system should be a closed one to prevent loss of the solvent. Preferably the solvent shall be less volatile than the alcohol of the ester starting material.

While the sucrose employed in the present process may take the form of the less pure materials which are available as by-products of sugar refining, etc., best results are obtained with the relatively pure solid forms of sucrose which are available in abundance at very low cost.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. The process of producing a drying oil which compises treating a saccharide selected from the class consisting of sucrose and raffinose with an ester of a drying oil fatty acid and a volatile lower alcohol, employing at least about 6 moles of said ester for each mole of said saccharide, in the presence of an alkaline catalyst at a temperature of between about 20° C. and 120° C., until said saccharide contains at least 4 of said acid groups per molecule of saccharide.

2. The process as defined by claim 1 of producing a drying oil wherein the fatty acid moiety is a poly-unsaturated fatty acid.

3. The process as defined by claim 1 of producing a drying oil wherein the fatty acid moiety is a conjugated poly-unsaturated fatty acid.

4. The process as defined by claim 1 of producing a drying oil wherein the reaction is conducted in the presence of an alkaline catalyst which produces the characteristic phenolphthalein purple color when added in a 1% w./v. concentration in a 0.5% w./v. phenolphthalein solution in a solvent containing equal parts by volume of boiled N,N-dimethylformamide and carbon dioxide-free water.

5. The process as defined by claim 1 of producing a drying oil wherein the reaction is conducted in an organic solvent selected from the class consisting of aromatic, aliphatic, alicyclic and heterocyclic amides, tertiary amines and dialkyl sulfoxides.

6. The process as defined by claim 5 of producing a drying oil wherein the organic solvent is N,N-dimethylformamide.

7. The process as defined by claim 1 of producing a drying oil wherein the heating is conducted at a temperature of between about 80° and 110° C.

8. The process as defined by claim 1 of producing a drying oil wherein the volatile lower alcohol is removed from the reaction mixture as it is liberated.

9. The process as defined by claim 8 of producing a drying oil wherein the volatile lower alcohol is removed from the reaction mixture under vacuum.

References Cited in the file of this patent

UNITED STATES PATENTS

| | | |
|---|---|---|
| 1,739,863 | Rosenthal et al. | Dec. 17, 1929 |
| 2,077,371 | Rheineck et al. | Apr. 13, 1937 |
| 2,700,022 | Clayton et al. | Jan. 18, 1955 |
| 2,759,923 | Gibbons | Aug. 21, 1956 |
| 2,812,324 | Huber et al. | Nov. 5, 1957 |
| 2,831,854 | Tucker | Apr. 22, 1958 |

OTHER REFERENCES

Richter: "Organic Chemistry," 3rd Edition, published by Wiley and Sons (New York), 1952 (page 197 relied on).

UNITED STATES PATENT OFFICE
CERTIFICATION OF CORRECTION

Patent No. 2,970,142            January 31, 1961

Henry B. Hass

It is hereby certified that error appears in the above numbered patent requiring correction and that the said Letters Patent should read as corrected below.

Column 3, line 11, for "oiled" read -- boiled --; line 52, for "succrose" read -- sucrose --.

Signed and sealed this 18th day of July 1961.

(SEAL)
Attest:

ERNEST W. SWIDER            DAVID L. LADD
Attesting Officer            Commissioner of Patents